US012595902B1

(12) United States Patent
Jones et al.

(10) Patent No.: US 12,595,902 B1
(45) Date of Patent: Apr. 7, 2026

(54) LIGHTING FIXTURE WITH ADJUSTABLE APERTURE

(71) Applicant: USAI, LLC, New Windsor, NY (US)

(72) Inventors: Jonathan I. Jones, Highland, NY (US); Frank Cogliano, Pomona, NY (US)

(73) Assignee: USAI, LLC, New Windsor, NY (US)

(*) Notice: Subject to any disclaimer, the term of this patent is extended or adjusted under 35 U.S.C. 154(b) by 0 days.

(21) Appl. No.: 19/204,277

(22) Filed: May 9, 2025

(51) Int. Cl.

| | |
|---|---|
| ***F21V 21/00*** | (2006.01) |
| ***F21S 8/02*** | (2006.01) |
| ***F21V 21/04*** | (2006.01) |
| ***F21V 21/14*** | (2006.01) |
| ***F21V 29/74*** | (2015.01) |

(52) U.S. Cl.
CPC .............. *F21V 21/14* (2013.01); *F21S 8/026* (2013.01); *F21V 21/041* (2013.01); *F21V 29/74* (2015.01)

(58) Field of Classification Search
CPC ........... F21V 21/14; F21V 29/74; F21S 8/026
See application file for complete search history.

(56) References Cited

U.S. PATENT DOCUMENTS

| | | | | |
|---|---|---|---|---|
| 9,004,728 B2 * | 4/2015 | Thompson | .............. | F21V 21/30 362/418 |
| 10,344,952 B2 * | 7/2019 | Georgiev | ................ | F21V 21/26 |
| 10,371,329 B2 | 8/2019 | Coakley | | |
| 11,428,388 B1 * | 8/2022 | Hargroder | .............. | F21V 21/14 |

* cited by examiner

*Primary Examiner* — Gerald J Sufleta, II
(74) *Attorney, Agent, or Firm* — Farber LLC; Fritz L. Schweitzer, III

(57) ABSTRACT

A recessed lighting fixture operable to emit light through an opening in a surface panel into a room, has a fixture base having an opening. An aperture plate extends along an inside surface of the fixture base and has a collar extending through the opening of the fixture base and forming an aperture. A lighting assembly is connected to the fixture base and is operable to emit light through the aperture. The aperture plate is disposed between the fixture base and the first lighting assembly. A position of the aperture plate is adjustable along the longitudinal axis (X) and lateral axis (Y) of the fixture to adjust a position of the collar with respect to the opening in the surface panel to adapt to variations in the position of the opening in the surface panel without modifying the opening in the surface panel.

12 Claims, 4 Drawing Sheets

LIGHTING FIXTURE WITH ADJUSTABLE APERTURE

FIELD OF THE INVENTION

The invention pertains to lighting, and in particular recessed lighting fixtures.

BACKGROUND OF THE INVENTION

Recessed lighting fixtures have been a popular lighting solution for many years, offering a sleek and minimalistic look that blends seamlessly into a variety of interior designs. Traditionally, these fixtures were designed solely for functional purposes, providing general illumination for a room without attracting attention to themselves. However, with the rise of interior design as a prominent aspect of home improvement, the desire for aesthetically pleasing recessed lighting fixtures has increased.

One factor in creating an aesthetically pleasing recessed lighting installation is properly aligning the fixtures with openings in surface panels and having minimal gaps or spacing between lighting elements and such openings. However, there are often variances in the location and shape of such openings in surface panels. Sometimes misaligned or misshapen openings can be modified during installation (i.e., in the field) however such modifications increase installation time and cost. In addition, such modifications are not feasible for hard surface materials such as wood (millwork) and stone, which are being used more often in lighting installations.

Therefore, what is desired is a recessed lighting fixture which will adapt to variances in openings in surface panels without the need to modify such openings during installation.

SUMMARY OF THE INVENTION

The present invention relates to recessed lighting fixture which provides for adjustment of the fixture to accommodate variations in the placement and shape of opening in surface panels and is particularly suitable for surface panels comprising hard materials and lighting fixtures having multiple lighting elements where precise alignment is required.

In an embodiment, a recessed lighting fixture constructed in accordance with the invention is operable to emit light through an opening in a surface panel into a room. The fixture has a fixture base having an opening. An aperture plate extends along an inside surface of the fixture base and has a collar extending through the opening of the fixture base, and the collar defines an aperture.

A lighting assembly is connected to the fixture base and is operable to emit light through the aperture, and the aperture plate is disposed between the fixture base and the lighting assembly.

A position of the aperture plate is adjustable along at least a longitudinal axis (X) and a lateral axis (Y) of the lighting fixture to adjust a position of the collar with respect to the opening in the surface panel, whereby the lighting fixture can adapt to variations in the position of the opening in the surface panel without modifying the opening in the surface panel.

The adjustment of the position of the aperture plate along the longitudinal axis (X) and lateral axis (Y) preferably does not require movement of the lighting assembly along such axes, and the lighting assembly is preferably operable to rotate relative to the fixture base about a rotation axis parallel to a tertiary (Z) axis, where such rotation does not require rotation of the aperture plate.

Movement of the aperture plate along the longitudinal axis (X) and lateral axis (Y) to adjust a position of the collar with respect to the opening in the surface panel is constrained by one or more stops connected to the fixture base which can include a plurality of stops disposed around the aperture plate which project from the fixture base and are configured to engage the aperture plate. The stops can comprise an edge of the opening of the fixture base which is configured to engage the collar to limit movement of the aperture plate along the longitudinal axis (X) and lateral axis (Y).

Where the lighting fixture has multiple lighting elements and the surface panel has multiple openings, the recessed lighting fixture is operable to emit light through at least first and second openings in a surface panel into a room, and the fixture base has first and second openings.

A first aperture plate extends along an inside surface of the fixture base and has a first collar extending through the first opening of the fixture base. A second aperture plate extends along the inside surface of the fixture base and has a second collar extending through the second opening of the fixture base.

A first lighting assembly is connected to the fixture base and is operable to emit light through a first aperture defined by the first collar. A second lighting assembly is connected to the fixture base and is operable to emit light through a second aperture defined by the second collar.

The first aperture plate is disposed between the fixture base and the first lighting assembly, and the second aperture plate is disposed between the fixture base and the second lighting assembly.

A position of the first aperture plate is adjustable along at least the longitudinal axis (X) and lateral axis (Y) to adjust a position of the first collar with respect to the first opening in the surface panel, and a position of the second aperture plate is adjustable along at least the longitudinal axis (X) and lateral axis (Y) to adjust a position of the second collar with respect to the second opening in the surface panel.

The positions of the first and second aperture plates being independently adjustable, whereby the lighting fixture can adapt to variations in the positions of the first and second openings in the surface panel without modifying the first and second openings in the surface panel.

DETAILED DESCRIPTION OF THE PREFERRED EMBODIMENT

Figure 1:
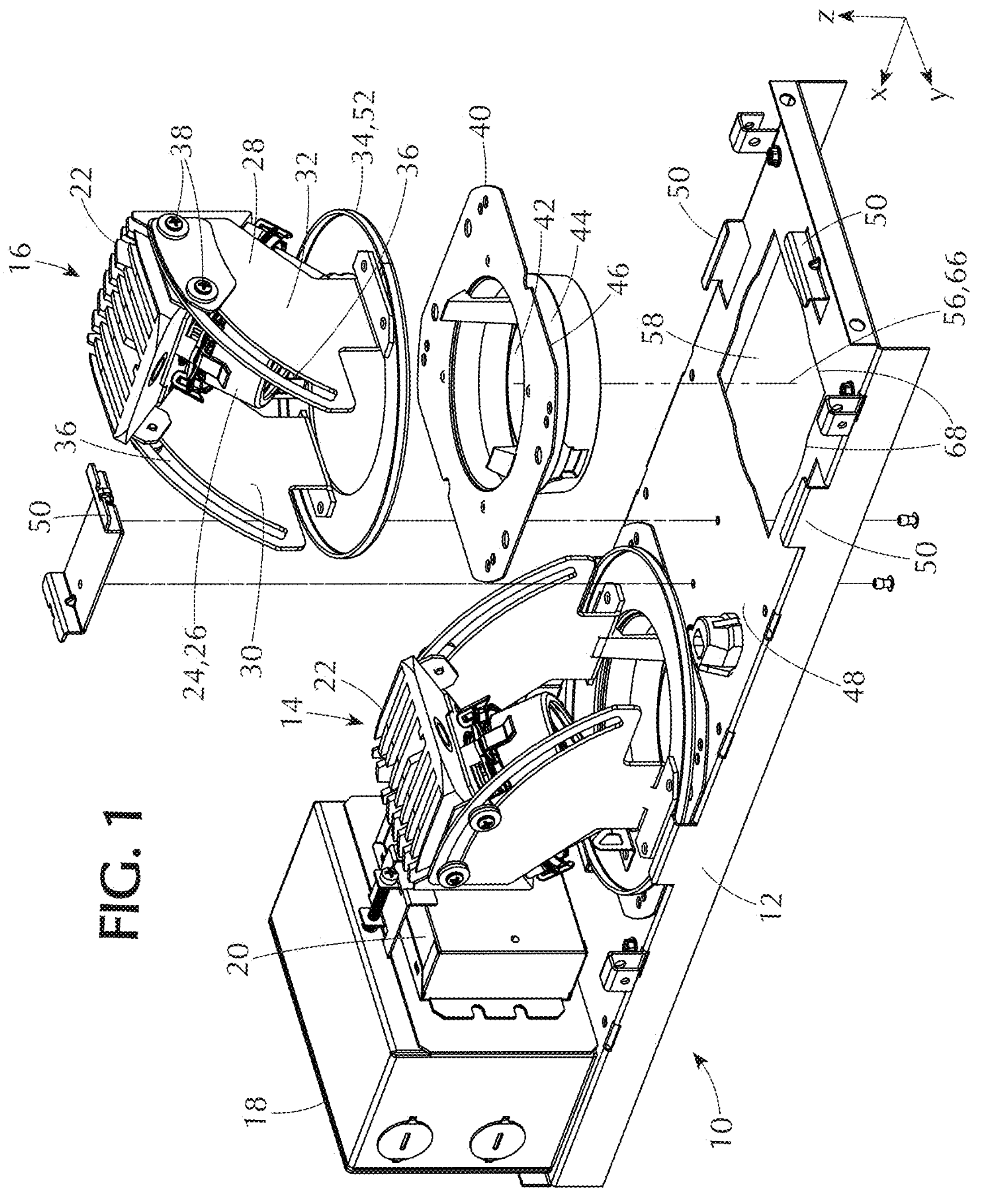
FIG. 1 is perspective view of a first embodiment of a lighting fixture according to the invention, from above.
Figure 2:
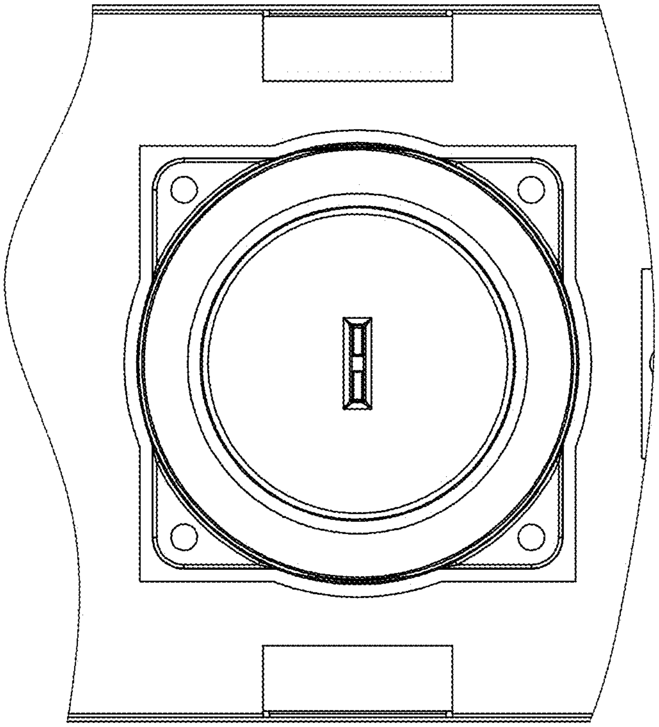
FIG. 2 is a bottom view of the lighting fixture of FIG. 1.
Figure 3:
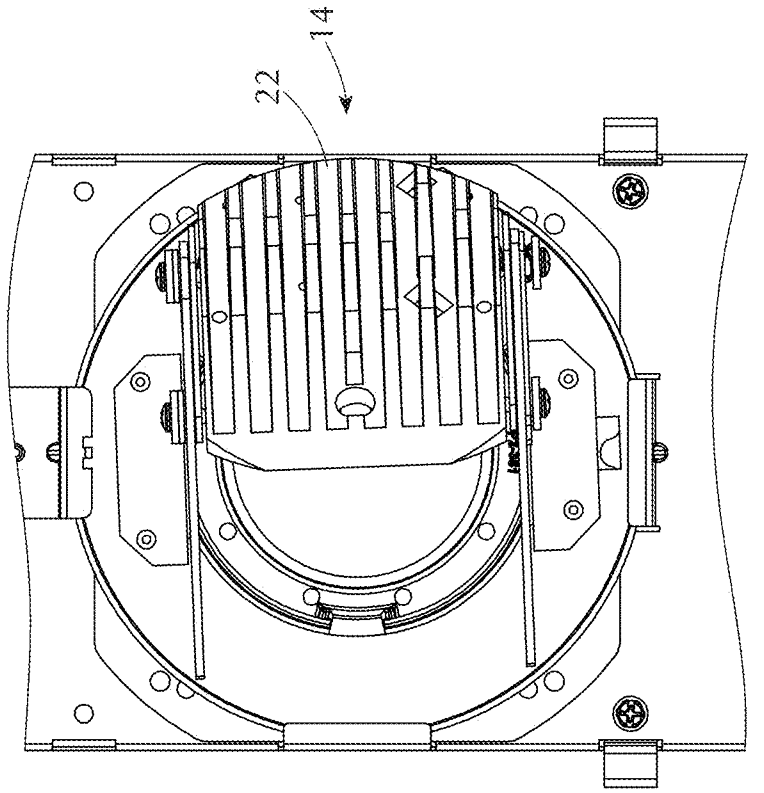
FIG. 3 is partial top plan view of the lighting fixture of FIG. 1.
Figure 4:
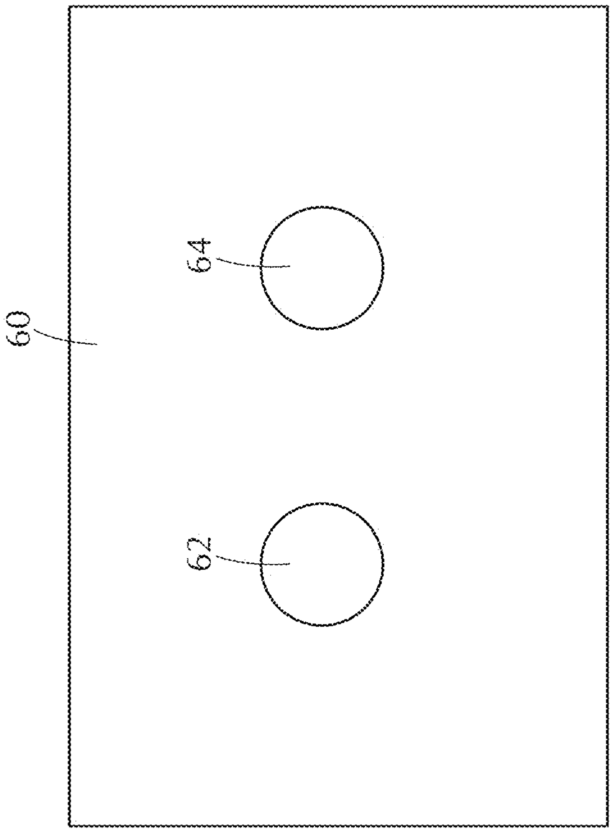
FIG. 4 bottom view of a surface panel.

Referring to FIGS. 1-4, a first preferred embodiment of a recessed lighting fixture 10 constructed according to the invention can be installed above a ceiling panel (or other surface) and configured to project light through an opening in the panel into a room. The lighting fixture 10 can be secured to one or more structural supports, such as one or more hanger bars, ceiling joists, or other suitable support structure.

The lighting fixture 10 is particularly suitable for applications where the surface panel (e.g., a ceiling panel 60) is formed of hard material such as wood (millwork) or stone, or similar hard material where adjustment of the position and/or size/shape (e.g., enlargement) of the opening in the material is not readily feasible during installation (in the field) due to the hard nature of the material and therefore precise spacing and alignment of the lighting fixture with the openings is required. The lighting fixture 10 is particularly suitable where the fixture includes dual or multiple lighting elements and corresponding separate openings in the surface panel, where each lighting elements must be precisely aligned with a separate opening, which requires a high degree of precision and alignment. In such cases an adjustment of the position of entire the lighting fixture is often not sufficient to obtain proper alignment of each lighting element with the associated opening, and independent adjustment is needed.

The lighting fixture 10 can include a fixture base 12 which can be configured to connect to a support structure (e.g., hanger bars, ceiling joists, or other suitable support structure) such that the fixture base 12 can be fixed relative to the support structure. The fixture base 12 can include one or more openings 58 therethrough.

The lighting fixture can include one or more light assemblies 14, 16 and can include a junction box 18 and an enclosure 20 (e.g., for a lighting driver), which can be fixedly or movably mounted to the fixture base 12. Each light assembly 14, 16 can be positioned above and/or adjacent an associated opening 62, 64 in a ceiling panel 60 and operable to emit light through the opening 62, 64 into the room below.

Each light assembly 14, 16 can include a heat sink 22 and a light module 24 connected to the heat sink 22 such that the heat sink 22 is operable to dissipate heat generated by the light module 24. The light module 24 can include a light source 26, such as one or more LEDs, or other suitable light emitting elements.

The lighting fixture 10 can have a longitudinal axis (X), a lateral axis (Y) and a tertiary axis (Z) which are mutually orthogonal such that, in a typical installation above a horizontal ceiling panel, the longitudinal axis (X) and the lateral axis (Y) are horizontal and parallel to the ceiling panel and the tertiary axis (Z) is vertical and perpendicular to the ceiling panel. The longitudinal axis (X) and lateral axis (Y) can define an X-Y plane, which in such is parallel to a plane of the ceiling panel.

Preferably, a position of each light assembly 14, 16 is adjustable relative to the fixture base 12. For example, the lighting fixture 10 can be configured as a "down light," where at least most of the light is emitted substantially vertically downward (e.g., substantially parallel to the tertiary axis (Z) and/or substantially perpendicular to the ceiling/wall installation location). For example, in the down light configuration an optical axis 56 of the light module 24 can be substantially vertical (e.g., parallel to Z-axis) such that it is perpendicular to the X-Y plane, so that the light is emitted substantially vertically downward.

The light fixture can also have a "wall-wash" configuration, where the light is emitted at substantial angle from vertical, and typically toward an adjacent wall or object to be illuminated and can be configured for infinite (or discrete) adjustment to any angle (or predetermined angles) between the downlight and wall-wash positions. However, other light configurations are contemplated.

Each light assembly 14, 16 can be mounted to a support frame 28 having a pair of opposing brackets 30, 32 which can be connected to a base plate 34. The brackets 30, 32 can be configured to permit tilting of the light assembly 14, 16 about an associated tilt axis parallel to the X-Y plane, relative to the support frame 28 and fixture base 12. The support frame 28 can be configured to permit the lighting assembly 14, 16 to move between several positions, including a down light and wall wash positions.

Each bracket 30, 32 can include a guide 36, which can have an elongated arcuate shape, as depicted. The light assembly 14, 16 can include one or more pins 38 which extend into the guides 36 to movably mount the light assembly to the support frame 28 such that the associated light assembly can tilt relative to the support frame 28 and fixture base 12. The lighting fixture 10 can include means to independently lock each light assembly 14, 16 in any tilt position, which can include a locking screw (not shown) which is selectively engageable with a portion of the associated frame 28, to fix the position of the light assembly 14, 16, relative to the support frame 28 and fixture base 12.

The light assembly 14, 16 can be configured to rotate relative to the fixture base 12 about a rotation axis 66 parallel to the tertiary axis (Z) to allowing for "aiming" the light emitted from the fixture. For example, the base plate 34 of the support frame 28 can be rotationally connected to the fixture base 12 to permit the support frame 28 and light assembly 14, 16 connected thereto to rotate relative to the fixture base 12 about a tertiary (Z) axis.

The lighting fixture 10 can include aperture plate 40 having an aperture 42 and a collar 44 disposed around and defining the aperture 42, where the collar 44 can depend downwardly from the aperture plate 40. For example, the collar 44 can be adapted to project downwardly (parallel to Z axis) into an associated opening 62, 64 of the panel 60 of the ceiling. The collar 44 can be sized and shaped to be closely received within the associated opening 62, 64 with a minimal gap between an outer edge of the collar 44 and an inner edge of the opening 62, 64 in the ceiling panel 60, of for example about $\frac{1}{32}$nd to $\frac{1}{8}$th inches.

However, there are often variances in the position of the openings in the ceiling panel relative to the lighting fixture 10, for example relative to the X and Y axes (and in some cases, relative to the Z axis). To accommodate for variances in the position of the openings 62, 64 in the panel 60, the aperture plate 40 and/or collar 44 can be movably connected to the lighting fixture 12 such that, at least during installation, the aperture plate 40 and/or the collar 44 is operable to move (or "float") parallel to one or both of the longitudinal (X) and lateral (Y) (horizontal) axes relative to the fixture base 12 and lighting fixture 10 (and optionally also relative to the Z axis). The aperture plate 40 and/or collar 44 can be constrained in the X and Y directions such that it is limited to move, for example, about $\frac{1}{8}^{th}$-$\frac{1}{2}$ inches, parallel to each axis.

Preferably, movement of the aperture plate 40 is toolless and no tools are required to unlock or loosen the aperture plate 40 and/or collar 44 to adjust the position. Preferably, manual force (by hand) is sufficient to urge or move the aperture plate 40 into a desired position before, during or after installation.

As discussed herein, the aperture plate 40 may be disposed between the fixture base 12 and the associated lighting assembly 14, 16. Therefore, the aperture plate 40 may bear all or some of the weight of the lighting assembly. However, the weight does not prevent manual movement of the aperture plate 40 relative to the fixture base 12 and/or lighting assembly.

The position of the collar 44 and aperture plate 40 are preferably adjustable after installation of the lighting fixture 10 through the opening 62, 64 of the panel 60. In addition, such position is adjustable after finishing (e.g., spackling) of the panel 60.

Where the lighting fixture 10 has multiple light assemblies 14, 16, the aperture plate 40 of each light assembly 14, 16 is preferably operable to move independently to allow for independent alignment of each aperture plate 40 and the associated collar 44 of each light assembly 14, 16 to compensate for independent variances in the positioning of the associated openings 62, 64 in the ceiling panel 60.

The aperture plate 40 can have a bottom surface 46 which contacts and is slidably (or otherwise movably) supported by or above a top surface 48 of the fixture base 12 around the opening 58 of the fixture base 12.

Movement of the aperture plate 40 parallel to the X and Y axes can be constrained by one or more stops 50 disposed around the aperture plate 40 which project upwardly from the fixture base 12 and are configured to engage the aperture plate 40.

The stops 50 can also be configured to substantially prevent substantial movement of the aperture plate 40 and collar 44 parallel to the tertiary axis (Z) (e.g., vertically) relative to the fixture base 12. For example, the stops 50 can project inwardly over the aperture plate 40 to limit such movement.

Alternatively, or additionally, edges 68 of the opening 58 of the fixture base 12 can serve as the X-Y constraints by contacting and limiting movement of the collar 44 relative to the fixture base 12 parallel to the X and/or Y axes.

The base plate 34 of the frame 28 can be disposed on and/or above the aperture plate 40 such that the aperture plate 40 is between the base plate 34 and the fixture base 12. The base plate 34 can be configured to slidably rotate on or above the aperture plate 40 such that the base plate 34 and the light assembly 14, 16 connected thereto can rotate independently of the aperture plate 40. The aperture plate 40 can be configured to move parallel to the X and Y axis relative to the fixture base 12 (as discussed above) independently of the base plate 34 such that adjustment of the position of the aperture plate 40 does not cause translation of the base plate 34 and associated light assembly.

The stops 50 can be configured to prevent substantial translation movement of the base plate 34 parallel to the X, Y and Z axes such that the position of the light assembly 14, 16 remains substantially fixed along such axes relative to the fixture base 12. Thus, movement of the aperture plate 40 parallel to the X and/or Y axis preferably does not cause similar movement of the base plate 34 or associated light assembly 14, 16.

The stops 50 can be configured to allow rotation of the base plate 34 about a rotation axis parallel to the Z axis.

The stops 50 can be in the form of hooks (e.g., inverted L-shaped) which extend upwardly from the fixture base 12 adjacent the edge 52 of the base plate 34 and inwardly over the edge 52, for example at four cardinal positions around the aperture plate 40 (e.g., at 90-degree intervals). However, fewer or more positions, and other configurations are possible.

Alternatively, the base plate 34 can be fixedly connected to the aperture plate 40 such that the base plate 34 moves in tandem with the aperture plate 40. Or the light assembly 14, 16 can be fixedly connected to the aperture plate 40, such as by a direct connection between the brackets 26, 28 and the aperture plate 40.

During installation, if the associated opening 62, 64 in the ceiling panel 60 and the collar 44 are misaligned, the collar 44 may contact the top of the ceiling panel 60. The position of the collar 44 may then be manually adjusted relative to the fixture base 12 to properly align the collar 44 with the associated opening 62, 26 in the ceiling panel. If the lighting fixture 10 contains multiple light assemblies 14, 26 such adjustment can be made independently for any or all light assemblies 14, 16 to properly align of the associated aperture plate 40 and collar 44, as need to achieve proper alignment of each light assembly.

The stops 50 can be configured to allow a slight amount of upward movement, or "play" (parallel to Z axis, e.g., vertically) of the aperture plate 40 (and optionally the corresponding light assembly 14, 16) relative to the fixture base 12 during installation of the light fixture 10 (for example about ⅛ inch), to facilitate X-Y adjustment of the aperture plate 40 and collar 44 during installation. Such slight movement can allow the aperture plate 40 to lift off the fixture base 12 slightly to temporarily reduce friction therebetween, when adjustment of the position of the associated collar 44 is required.

As one alternatively to the stops 50, the lighting fixture can include constraints in the form of fasteners or pins or the like (not shown) extending upwardly from the fixture base 12 and which extend through oversized openings (not shown) in the aperture plate 40 which are sized to permit limited X-Y movement of the collar relative to the housing.

The lighting fixture 10 is described herein as being installed and/or oriented with respect to a horizontal ceiling, which is typical. However, other orientations and locations are possible. For example, the lighting fixture 10 can be installed in a sloped ceiling, a vertical wall, a floor, or any other suitable location.

Although the invention has been described with reference to a particular arrangement of parts, features and the like, these are not intended to exhaust all possible arrangements or features, and indeed many other modifications and variations will be ascertainable to those of skill in the art.

What is claimed:

1. A recessed lighting fixture operable to emit light through an opening in a surface panel into a room, the light fixture comprising:

a fixture base having an opening, and having an inside surface;

an aperture plate extending along the inside surface of the fixture base and having a collar extending through the opening of the fixture base, and the collar defining an aperture;

a lighting assembly connected to the fixture base and operable to emit light through the aperture;

the aperture plate being disposed between the fixture base and the lighting assembly;

the lighting fixture having a longitudinal axis (X), a lateral axis (Y) and a tertiary axis (Z) which are mutually orthogonal, and the longitudinal axis (X) and lateral axis (Y) defining an X-Y plane which is parallel to a plane of the surface panel; and a position of the aperture plate being adjustable by translation parallel to at least the longitudinal axis (X) and lateral axis (Y) to adjust a position of the collar with respect to the opening in the surface panel;

whereby the lighting fixture can adapt to variations in the position of the opening in the surface panel without modifying the opening in the surface panel.

2. The recessed lighting fixture of claim 1, wherein:
adjustment of the position of the aperture plate parallel to the longitudinal axis (X) and lateral axis (Y) does not require movement of the lighting assembly along such axes.

3. The recessed lighting fixture of claim 1, wherein:
adjustment of the position of the aperture plate parallel to the longitudinal axis (X) and lateral axis (Y) causes movement of the lighting assembly along such axes.

4. The recessed lighting fixture of claim 1, wherein:
the lighting assembly is operable to rotate relative to the fixture base about a rotation axis parallel to the tertiary (Z) axis; and
such rotation does not require rotation of the aperture plate.

5. The recessed lighting fixture of claim 1, wherein:
the lighting assembly is operable to rotate relative to the fixture base about a rotation axis parallel to the tertiary (Z) axis; and
such rotation causes rotation of the aperture plate.

6. The recessed lighting fixture of claim 1, wherein:
movement of the aperture plate parallel to at least the longitudinal axis (X) and lateral axis (Y) to adjust a position of the collar with respect to the opening in the surface panel is constrained by one or more stops connected to the fixture base.

7. The recessed lighting fixture of claim 6, wherein:
the one or more stops include a plurality of stops disposed around the aperture plate which project from the fixture base and are configured to engage the aperture plate.

8. The recessed lighting fixture of claim 6, wherein:
the one or more stops comprises an edge of the opening of the fixture base, and the edge of the fixture base is configured to engage the collar to limit movement of the aperture plate parallel to at least the longitudinal axis (X) and lateral axis (Y).

9. The recessed lighting fixture of claim 1, operable to emit light through first and second openings in a surface panel into a room, the lighting fixture further comprising:
the fixture base having first and second openings, and having an inside surface;
a first aperture plate extending along the inside surface of the fixture base and having a first collar extending through the first opening of the fixture base, and the first collar defining a first aperture;
a second aperture plate extending along the inside surface of the fixture base and having a second collar extending through the second opening of the fixture base, and the second collar defining a second aperture;
a first lighting assembly connected to the fixture base and operable to emit light through the first aperture;
a second lighting assembly connected to the fixture base and operable to emit light through the second aperture;
the first aperture plate being disposed between the fixture base and the first lighting assembly;
the second aperture plate being disposed between the fixture base and the second lighting assembly;
a position of the first aperture plate being adjustable by translation parallel to at least the longitudinal axis (X) and lateral axis (Y) to adjust a position of the first collar with respect to the first opening in the surface panel;
a position of the second aperture plate being adjustable by translation parallel to at least the longitudinal axis (X) and lateral axis (Y) to adjust a position of the second collar with respect to the second opening in the surface panel; and
the positions of the first and second aperture plates being independently adjustable by translation parallel to at least the longitudinal axis (X) and lateral axis (Y) to independently adjust the positions of the first and second collars with respect to the first and second openings in the surface panel, respectively;
whereby the lighting fixture can adapt to variations in the positions of the first and second openings in the surface panel without modifying the first and second openings in the surface panel.

10. The recessed lighting fixture of claim 1, wherein:
the position of the aperture plate being adjustable by translation along at least the longitudinal axis (X) and lateral axis (Y) by $1/8^{th}$ to ½ inches.

11. The recessed lighting fixture of claim 9, wherein:
the position of the first and second aperture plates each being adjustable by translation along at least the longitudinal axis (X) and lateral axis (Y) by $1/8^{th}$ to ½ inches.

12. The recessed lighting fixture of claim 6, further comprising:
the one or more stops are configured to permit limited upward translational movement of the aperture plate relative to the fixture base parallel to the tertiary axis (Z);
whereby such upward translational movement of the aperture plate is operable to temporarily reduce friction between the aperture plate and the fixture plate, during installation of the light fixture, to facilitate translational adjustment of the aperture plate relative to the fixture plate parallel to the longitudinal axis (X) and lateral axis (Y).

* * * * *